March 27, 1962 D. A. FOECKING 3,027,454
SQUELCH SYSTEM
Filed March 28, 1960
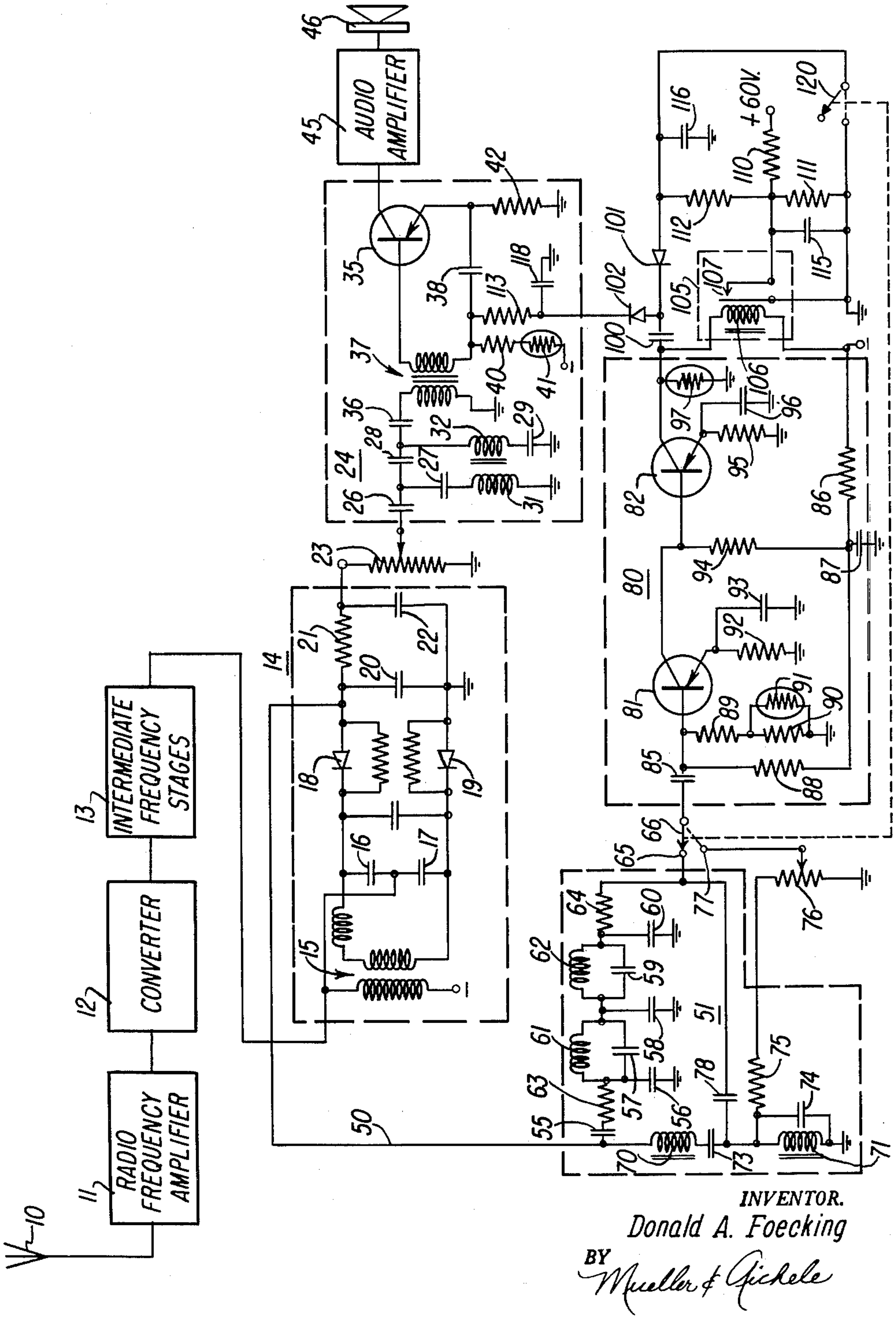
INVENTOR.
Donald A. Foecking
BY Mueller & Aichele
Attys.

United States Patent Office 3,027,454
Patented Mar. 27, 1962

3,027,454
SQUELCH SYSTEM

Donald A. Foecking, Chicago, Ill., assignor to Motorola, Inc., Chicago, Ill., a corporation of Illinois Filed Mar. 23, 1960, Ser. No. 17,892
9 Claims. (Cl. 250—20)

This invention relates generally to squelch circuits and more particularly to a transistor audio circuit which is cut off when no signal is being received to eliminate noise and which translates signals when the noise is reduced and/or when a particular control signal is received.

It has been found essential in high gain communication receivers to provide a squelch system for cutting off the audio output of the receiver in the absence of a carrier wave modulated by a signal to be received. Squelch systems have also been used wherein the audio output is normally cut off and is actuated by a particular received control signal to translate the received signals. Squelch systems responsive both to received carrier waves and to control signals are disclosed and claimed in Peth Patent No. 2,918,571, issued December 22, 1959, and assigned to the assignee of the present invention.

In certain applications, such as in self-contained portable equipment, it is particularly important that the squelch circuit be simple and contain a minimum of parts so that it can be provided in a small space. Also it is desired that the power consumed be held to a minimum since the equipment may have a self-contained battery and the battery life should be extended as much as possible. It is, of course, necessary that such simple equipment provide highly reliable operation.

It is therefore an object of the present invention to provide a simple squelch circuit for operation either in response to a carrier, or in response to a particular received control signal.

A further object of the invention is to provide a combined squelch circuit having a first position in which it responds to noise produced in the absence of a carrier, and a second position in which it responds to a particular tone which may be transmitted.

Another object of the invention is to provide a squelch system for a frequency modulation receiver which operates in response to noise received in the absence of a carrier to cut off the audio, and which may be set to be normally cut off except when a particular tone is received with the audio.

A feature of the invention is the provision of a simplified squelch circuit wherein a single amplifier may be switched to operate as a noise amplifier for carrier squelch operation, or as a tone amplifier for selective squelch operation.

A further feature of the invention is the provision of a frequency modulation receiver having a discriminator for providing an audio output, and which produces noise in the absence of a carrier, including a squelch system having a filter with a first filter section selecting noise frequencies above the signal frequencies, an amplifier and limiter for increasing the noise output, and a voltage doubler circuit for providing a control voltage to cut off the audio system, and wherein the filter has a second section selecting control tones which are applied to the amplifier and to a vibrating reed unit, with a bias circuit cutting off the audio section and being disabled by the reed unit in response to a particular tone.

Another feature of the invention is the provision of a transistor squelch system for a transistorized frequency modulation receiver including a first switch for selectively applying low frequency tones or high frequency noise from a filter to an amplifier, and a control circuit including a second switch ganged with the first for applying a control voltage to a transistor audio stage of the receiver to cut off the stage. The switches have a first position applying noise to the amplifier and applying the rectified noise output to the audio stage to cut the same off, and a second position for applying tones to the amplifier and a bias voltage to the audio stage to cut it off, with the bias voltage being reduced by action of a reed unit coupled to the amplifier and responding to a particular tone so that the audio stage reproduces the received signals.

The invention is illustrated in the drawing wherein the single feature is a schematic diagram of a receiver showing the detailed circuit of the audio discriminator and amplifier, and the squelch control therefor.

In practicing the invention there is provided an audio or squelch control system for a frequency modulation receiver which selectively cuts off one stage of the receiver audio system so that no audio is reproduced. The system includes a filter network coupled to the discriminator of the receiver having first and second outputs at which low frequency tone signals and high frequency noise signals are applied respectively. A switch is provided having a first section for selectively connecting one of the two outputs of the filter to a transistor amplifier circuit. The switch includes a second section ganged with the first and which is connected in a bias circuit for the transistor audio stage. The amplifier circuit may include two stages, the second of which may function as a limiter in the presence of strong signals. A voltage doubler circuit is coupled to the output of the second stage and rectifies the amplified signals. For carrier squelch operation the rectified noise signals produced by the frequency modulation receiver in the absence of a carrier are applied to a transistor audio stage to bias the same to cut off the audio section of the receiver so that noise is not reproduced. A vibrating reed unit has its actuating coil also connected to the output of the transistor amplifier. When the switch is in the tone position, tones from the filter network are applied to the amplifier, and the bias circuit is adjusted to cut off the transistor audio stage. A tone of a particular frequency will actuate the vibrating reed unit to close its contacts which are connected in the bias circuit and which reduce the bias to the transistor audio stage so that audio signals are reproduced thereby.

Referring now to the drawing, there is shown a radio receiver of the superheterodyne type including an antenna 10 which applies waves to a radio frequency amplifier 11. The amplified waves are applied to converter 12 which reduces the frequency thereof. The converter may include one or more stages of frequency conversion to provide the desired intermediate frequency. Intermediate frequency waves from the converter 12 are applied to the intermediate frequency stages 13 which may include amplifiers, limiters, and selective circuit so that the intermediate frequency output is of a high constant level and excludes waves from adjacent channels.

The intermediate frequency waves are applied to a discriminator 14 which may be of standard construction. The discriminator includes transformer 15 and a pair of capacitors 16 and 17 connected to provide signal voltages having a quadrature relation. Rectified signals are produced by the diodes 18 and 19, and the audio output is derived across capacitor 20. The audio signals are filtered by resistor 21 and capacitor 22 and applied to volume control potentiometer 23.

A portion of the audio output is derived from the volume control 23 and applied to a filter 24 which rejects the low frequency tones and applies the audio signals to the first stage of the audio amplifier. The filter includes capacitors 26, 27, 28 and 29, and coils 31 and 32, and acts to sharply attenuate frequencies below the band of audio frequencies to be reproduced. The audio signals are applied to transistor 35 through coupling capacitor 36, transformer 37 and coupling capacitor 38. The signals are applied between the base and emitter electrodes of the transistor 35. Bias potential is applied from a negative source through resistors 40 and 41 to the base electrode. Resistor 41 may have a characteristic which changes with voltage to compensate for changes in the bias voltage applied to the transistor 35 with changes in voltage as will be described. The resistance of resistor 41 decreases with increase in the voltage thereacross. The emitter electrode of transistor 35 is grounded through resistor 42. The output from the transistor is derived from the collector electrode and applied to audio output amplifier 45. This output amplifier provides audio signals to a loudspeaker 46 or other reproducing means.

The squelch operation is provided by a circuit which derives signals from the discriminator from across the audio output capacitor 20. These are applied through conductor 50 to a filter network 51. The filter 51 includes elements forming a low pass filter for selecting the low frequency control tones from the audio output. This includes capacitors 55, 56, 57, 58, 59 and 60, coils 61 and 62, and resistors 63 and 64. The low frequency output signal is applied to contact 65 which is selectively engaged by switch arm 66.

The filter 51 also includes a high pass section, including coils 70 and 71, capacitors 73 and 74 and resistor 75, which applies high frequency noise signals to potentiometer 76. A portion of the signals are derived from the potentiometer and applied to contact 77. A certain amount of the high frequency noise is applied through capacitor 78 to the contact 65 for a reason to be explained. The switch 66 selectively engages contacts 65 and 77 to apply low frequency tones or high frequency noise to the amplifier 80.

The amplifier 80 includes two transistor stages which include transistors 81 and 82. Signals are applied to the transistor 81 from the switch 66 through coupling condenser 85. Bias potential is applied to the transistors from a negative source through a filter including resistor 86 and capacitor 87. Voltage from the filter is applied through resistors 88, 89, 90 and 91 to the base electrode of transistor 81. These resistors form a voltage divider with the resistor 91 having a negative temperature coefficient so that the base potential may compensate for the temperature characteristics of the transistor. The emitter electrode is grounded through resistor 92 which is bypassed by capacitor 93. The output is derived from the collector of transistor 81 which is directly coupled to the base of transistor 82. Bias potential is applied to the base of transistor 82 from the filter 86, 87 through resistor 94, and the emitter is grounded through resistor 95, bypassed by capacitor 96. The output of the amplifier 80 is derived from the collector of transistor 82.

A vibrating reed device 105 is connected to the output of amplifier 80 and includes a coil 106 and contacts 107 which intermittently close when a particular tone frequency is applied to the coil. Coil 106 and resistor 97, which has a voltage sensitive characteristic, are connected to the collector electrode of transistor 82 and form the load for amplifier 80. The value of resistor 97 decreases with increase in voltage and this tends to compensate for increase in output as the gain of amplifier 80 is increased with increase in supply voltage. The system may be used in portable equipment having batteries and the voltage thereof changes over a wide range between fully charged and partly discharged conditions. The reed device may respond to noise pulses of high amplitude and the lowered value of resistor 97 at high supply voltage values reduces the output to the reed device 105 to hold the same substantially constant with variations in supply voltages. A voltage doubler rectifier circuit formed by diodes 101 and 102 is also coupled to the output of amplifier 80 through capacitor 100.

A bias circuit is provided for cutting off transistor 35 of the audio section of the receiver and includes resistors 110 and 111 connected from a positive potential to ground. The common junction of the resistors is connected through resistor 112, rectifiers 101 and 102, resistor 113 and transformer 37 to the base of transistor 35. The contacts 107 of device 105 selectively short the resistor 111, with the contact being bridged by capacitor 115. Resistors 111 and 112 are bypassed by capacitor 116 and are selectively shorted by switch 120 which is ganged with the switch 66, previously described.

Considering now the operation of the squelch system, when the switches 66 and 120 are in the position shown, the system operates as a tone controlled squelch system. Tone frequencies are applied from filter 51 to the amplifier and amplified and limited by transistor stages 81 and 82 to drive the vibrating reed unit 105. The potential applied across resistors 110 and 111 provides a positive potential at the junction therebetween which is applied through resistor 112, rectifiers 101 and 102, resistor 113 and transformer 37 to the base of transistor 35. This is a sufficiently high positive potential to hold the transistor 35 cut off. However, when the reed device 105 operates in response to a tone, the contacts 107 thereof will close to short out the resistor 111. Accordingly, the positive potential will be removed from the base of transistor 35 so that this transistor can conduct to transmit the audio signals from the discriminator 14 to the audio amplifier 45.

It is also desired that the squelch system may be set so that it will be operative in response to any received carrier, and such action takes place when the switches 66 and 120 are moved to the dotted positions. In such case switch arm 66 makes contact with terminal 77 to apply the noise voltage to the amplifier 80. The switch 120 will ground rectifier 101 and provide a short across resistors 111 and 112 so that there is no bias potential applied to the base of transistor 35. Accordingly the transistor 35 will be normally conductive. The noise voltage from terminal 77 will be amplified in the stages 81 and 82 and will be at a level so that limiting action will take place in stage 82. The substantially constant output voltage of amplifier 80 will be coupled through capacitor 100 to the voltage doubler including rectifier 101 and 102. The doubler voltage will be developed across capacitor 118 and applied through resistor 113 and transformer 37 to the base of transistor 35. This will provide a high positive voltage which will cut off the transistor 35 so that the noise will not be reproduced thereby. Resistor 41 has a value which is reduced with increase in supply voltage to compensate for increase in the bias voltage with increase in gain of amplifier 80 with increase in supply voltage. As previously stated, the system may be used in portable equipment having self-contained batteries, and the voltage from the batteries may vary through a wide range.

In systems constructed in accordance with the invention, the audio frequencies transmitted have extended from 300 to 3,000 cycles per second. The control tones used are below the audio frequencies and may be in the range from 50 to 200 cycles per second. The filter 24 will reject these frequencies so the tones are not applied to the audio stage including transistor 35, and the low pass section of filter 51 will provided the tones to terminal 65. The noise frequencies used to operate the squelch in the absence of a carrier are frequencies extending above the audio range, that is above 3,000 cycles per second. It is well known that in a frequency modulation receiver having effective limiting, the noise increases in the absence of a carrier and decreases as the receiver is quieted in response to a carrier. Noise above 3,000 cycles per second will be derived by the high pass section of filter 51 to provide the carrier, or noise squelch operation.

The capacitor 78 of filter 51 couples some high frequency noise energy to the output terminal 65 of the low frequency section of the filter. This is effective during selective tone squelch operation to provide noise immunity in the absence of a carrier. This high frequency noise energy in effect reduces the low frequency noise which might be applied through the low pass filter section to the amplifier 80 and to the reed unit 105. This is because of the limiting action of the transistor 82 which holds the overall output level of amplifier 80 at a substantially fixed value, so that spurious low frequency signals which might actuate the reed unit 85 are reduced by the high frequency which is applied. As the high frequency noise is reduced when a carrier is received, the high frequency signals applied to amplifier 80 are reduced and the tones which are applied provide substantially the entire output of the amplifier. Therefore the sensitivity of the system to tones is not substantially reduced by the high frequency coupling.

The combined squelch system disclosed results in the elimination of one amplifier as compared to systems in which separate tone and noise amplifiers are used. The system is not otherwise complicated since it is always desired to have a switch so that either selective (tone) squelch or carrier (noise) squelch operation can be provided. This same switch functions to select the signals applied to the amplifier and to condition the bias circuit for either carrier squelch operation, wherein the noise produced in the absence of the carrier operates to bias off the audio stage, or selective squelch operation wherein a fixed bias cuts off the audio stage and is removed by action of the control or tone signals. This saving of an amplifier not only saves space on the chassis to thereby be particularly advantageous for portable units, but also results in a saving of power consumption since both amplifiers must be operative continuously if separate amplifiers are provided.

I claim:

1. A system for selectively translating audio signals from a source, which may also provide noise signals and control signals, said system including in combination, an audio amplifier including a first transistor having a plurality of electrodes, means for applying audio signals from the source to an electrode of said transistor, an output circuit connected to another electrode of said transistor, and a control circuit coupled to said transistor for selectively applying a potential to cut off said transistor, said control circuit including filter means coupled to the source and including a high pass filter section for passing noise signals and a low pass filter section for passing a range of tone signals, control amplifier means, switch means having first and second sections, said first switch section selectively connecting said high and low pass filter sections to said control amplifier, and a bias circuit including potential supply means and rectifier means coupled to said control amplifier means, said second section of said switch means selectively disabling said potential supply means, said bias circuit including frequency selective means connected to said control amplifier and having a portion coupled to said potential supply means to disable the same in response to a particular tone frequency, said switch means thereby selectively determining the operation of said control circuit to provide response individually to received control tone signals and to reduction of said noise signals.

2. A squelch system for controlling the translation of audio signals from a source, which may also provide noise signals and control signals, through an audio stage, said squelch system selectively applying a control potential to cut off the audio stage and including in combination, filter means coupled to the source and including a first high pass section for passing noise signals and a second low pass section for passing tone signals, control amplifier means, switch means having first and second sections, said first switch section selectively connecting said first and second filter sections to said control amplifier, and a bias circuit including potential supply means, rectifier means and frequency selective means, said rectifier means and said frequency selective means being coupled to said control amplifier and responsive to signals therefrom, said second section of said switch means selectively disabling said potential supply means and rendering said rectifier means operative to produce a control potential, said frequency selective means including a portion coupled to said potential supply means to selectively disable the same in response to a particular tone frequency to provide a control potential, said switch means thereby selectively determining the operation of said squelch circuit between response to said control tone signals and response to reduction of said noise signals.

3. A system for selectively translating signals derived from a received carrier wave, which may include audio signals, noise signals and control signals, said system including in combination, an audio amplifier including a first transistor having a plurality of electrodes, means for applying the derived signals to an electrode of said transistor, an output circuit connected to another electrode of said transistor, and a control circuit coupled to said transistor for selectively applying a control potential to cut off said transistor, said control circuit including filter means for the derived signals having a first section for passing noise signals and a second section for passing tone signals, control amplifier means, and a bias circuit including potential supply means, rectifier means and frequency selective reed means, said rectifier means and said frequency selective reed means being coupled to said control amplifier means and responsive to output signals therefrom, said reed means including contacts coupled to said potential supply means, and switch means having first and second sections, said first switch section selectively connecting the outputs of said first and second filter sections to said control amplifier, said second section of said switch means being connected to said bias circuit, said switch means having a first position in which said first section thereof applies noise signals to said control amplifier means and said second section renders said rectifier means operative to provide a control potential for controlling said transistor of said audio amplifier in response to a received carrier wave, said switch means having a second position in which said first section thereof applies tone signals to said control amplifier means and said second section conditions said bias circuit to apply a control potential from said potential supply means to said transistor of said audio amplifier with said reed means operating to alter the control potential in response to a particular tone frequency.

4. In a frequency modulation radio receiver having an audio circuit, a system for selectively translating through the circuit audio signals derived by the receiver from a carrier wave signal and which may include noise signals and tone signals, said system including a control circuit coupled to the audio circuit for selectively applying thereto a control potential to cut off the same, said control circuit including in combination, filter means coupled to the source and including a first section for passing noise signals and a second section for passing tone signals, control amplifier means, bias circuit means including potential supply means, rectifier means and frequency selective means, said rectifier means and said frequency selective means being coupled to said control amplifier means, said frequency selective means including a portion coupled to said potential supply means to disable the same in response to a particular tone frequency, and switch means having first and second sections, said first switch section selectively connecting said first and second filter sections to said control amplifier means, said second section of said switch means being connected to said potential supply means and to said rectifier means, said switch means having a first position in which noise signals from said filter means are applied to said control amplifier means and said rectifier means is rendered operative to provide a control potential in response to the noise output from said control amplifier means, and said switch means having a second position in which tone signals from said filter means are applied to said control amplifier means and said bias circuit means provides a control potential from potential supply means, with said frequency selective means operating to reduce the control potential when a particular tone is applied thereto from said control amplifier means.

5. A system for selectively translating audio signals from a source, which may also provide noise signals and tone signals, through a transistor stage, said system including a control circuit coupled to the transistor stage for selectively applying a control potential to cut off the stage, said control circuit including in combination, filter means coupled to the source including a first section for passing noise signals and a second section for passing tone signals, control amplifier means, bias circuit means including potential supply means, rectifier means and vibratory reed means, said rectifier means being coupled to said control amplifier means and producing a control potential from signals produced thereby, said vibratory reed means including a winding coupled to said control amplifier means and contacts actuated thereby and coupled to said potential supply means to disable the same in response to a particular tone frequency, and switch means having first and second sections, said first switch section selectively connecting said first and second filter sections to said control amplifier means, said second section of said switch means being connected to said potential supply means to selectively disable the same, said switch means having a first position in which noise signals from said filter means are applied to said control amplifier means, and said potential supply means is disabled and said rectifier means is rendered operative to produce a control potential from the output of said control amplifier means, and said switch means having a second position in which tone signals from said filter means are applied to said control amplifier means and said potential supply means produces a control potential, with said reed means operating to reduce the control potential in response to a particular tone from said control amplifier means.

6. A system for selectively translating signals derived from a receiver carrier wave which may include audio signals, noise signals and the tone signals, and including an audio stage for preventing translation of signals in response to the application thereto of a control potential, said system including in combination, filter means for the derived signals including a high pass filter section for passing noise signals and a low pass filter section for passing tone signals, control amplifier means, bias circuit means including potential supply means, rectifier means and vibratory reed means, said potential supply means including a voltage divider for providing a control potential of a polarity and amplitude to prevent translation of signals by the audio stage, said rectifier means including a voltage doubler circuit connected to said control amplifier means and to the audio stage and producing a control potential of a polarity and amplitude to prevent translation of signals thereby, said rectifier means being connected to said voltage divider to apply potential therefrom to the audio stage, said vibratory reed means including a winding coupled to said control amplifier and contacts controlled thereby and coupled to said voltage divider to short circuit a portion thereof in response to a particular tone frequency, and switch means including a first section having first and second positions respectively connecting said high and low pass filter sections to said control amplifier means, said switch means including a second section operating with said first section and having a first position short circuiting a portion of said voltage divider and establishing a ground for said voltage doubler circuit and a second open position, said switch means in said first position applying noise signals from said filter means to said control amplifier means and causing said rectifier means to apply to the audio stage a control potential from the output of said control amplifier means, and said switch means in said second position applying tone signals from said filter means to said control amplifier means and causing said rectifier means to apply said potential from said voltage divider to the audio stage, with said reed means operating to short circuit a part of said voltage divider and thereby reduce said control potential when a particular tone is applied thereto from said control amplifier means.

7. A system for selectively translating signals derived from a carrier wave which may include audio signals, noise signals and the tone signals, and including an audio stage for preventing translation of signals in response to the application thereto of a control potential, said system including in combination, control amplifier means for amplifying the derived signals and selectively providing noise signals and tone signals, bias circuit means including potential supply means, rectifier means and vibratory reed means, said potential supply means including a voltage divider for providing a control potential of a polarity and amplitude to prevent translation of signals by the audio stage, said rectifier means including a voltage doubler circuit connected to said control amplifier means and to the audio stage and producing a control potential of a polarity and amplitude to prevent translation of signals thereby, said rectifier means being connected to said voltage divider to apply potential therefrom to the audio stage, said vibratory reed means including a winding coupled to said control amplifier and contacts controlled thereby and coupled to said voltage divider to short circuit a portion thereof in response to a particular tone frequency, and switch means operative to short circuit a portion of said voltage divider and establishing a ground for said voltage doubler so that said rectifier means applies to the audio stage a control potential from the output of said control amplifier means, and said voltage divider applying potential through said rectifier means to the audio stage when said switch means is inoperative, with said reed means operating to short a portion of said voltage divider and reduce said control potential when a particular tone is applied thereto from said control amplifier means.

8. A system for selectively translating signals derived from a received carrier which may include audio signals, noise signals and tone signals, through a transistor stage, said system including a control circuit coupled to the transistor stage for selectively applying a control potential to cut off the stage, said control circuit including in combination, filter means for the derived signals having a high pass filter section for passing noise signals and a low pass filter section for passing tone signals, control amplifier means including first and second transistors and means biasing said second transistor to operate as a limiter, bias circuit means including potential supply means, rectifier means and frequency selective means, said rectifier means and said frequency selective means being coupled to said control amplifier means, said frequency selective means including a portion coupled to said potential supply means to disable the same in response to a particular tone frequency, and switch means having first and second sections, said first switch section selectively connecting said high and low pass filter sections to said control amplifier means, said second section of said switch means being connected to said potential supply means and to said rectifier means, said switch means having a first position in which noise signals from said filter means are applied to said control amplifier means and said rectifier means is rendered operative to provide a control potential in response to the noise output from said control amplifier means, and said switch means having a second position in which tone signals from said filter means are applied to said control amplifier means and said potential supply means of said bias circuit means provides a control potential, with said frequency selective means operating to reduce the control potential when a particular tone is applied thereto from said control amplifier means.

9. In a frequency modulation radio receiver having an audio circuit, a system for selectively translating through the audio circuit signals derived by the receiver, and which may include noise signals and tone signals, said system including a control circuit coupled to the transistor audio circuit for selectively applying thereto a control potential to cut off the same, said control circuit including in combination, filter means coupled to the source and including a first section for passing noise signals and a second section for passing noise and tone signals, control amplifier mean including first and second transistors and means biasing said second transistor to operate as a limiter, bias circuit means including potential supply means, rectifier means and frequency selective means, said rectifier means and said frequency selective means being coupled to said control amplifier means, said frequency selective means including a portion coupled to said potential supply means to disable the same in response to a particular tone frequency, and switch means having first and second sections, said first switch section selectively connecting said first and second filter sections to said control amplifier means, said second section of said switch means being connected to said potential supply means and to said rectifier means, said switch means having a first position in which noise signals passed by said first filter section are applied to said control amplifier means and said rectifier means is rendered operative to provide a control potential in response to the noise output from said control amplifier means, and said switch means having a second position in which tone signals passed by said second filter section are applied to said control amplifier means and said potential supply means of said bias circuit means provides a potential control, with said frequency selective means operating to reduce the control potential when a particular tone is applied thereto from said control amplifier means.

References Cited in the file of this patent

UNITED STATES PATENTS 2,743,361 Bauman -------------- Apr. 24, 1956

FOREIGN PATENTS 534,341 Canada -------------- Dec. 11, 1956